(12) United States Patent
Russell et al.

(10) Patent No.: US 12,138,703 B2
(45) Date of Patent: Nov. 12, 2024

(54) APPARATUS AND METHOD FOR HARD FACING A SUBSTRATE

(71) Applicant: Cutting & Wear Resistant Developments Limited, Sheffield (GB)

(72) Inventors: Mark Russell, Sheffield (GB); Andy Ollerenshaw, Sheffield (GB); Sureshkumar Venkatachalam, Sheffield (GB)

(73) Assignee: Cutting & Wear Resistant Developments Limited, Sheffield (GB)

( * ) Notice: Subject to any disclaimer, the term of this patent is extended or adjusted under 35 U.S.C. 154(b) by 1127 days.

(21) Appl. No.: 16/947,716

(22) Filed: Aug. 13, 2020

(65) Prior Publication Data
US 2021/0046566 A1   Feb. 18, 2021

(30) Foreign Application Priority Data
Aug. 16, 2019   (GB) ...................... 1911769

(51) Int. Cl.
*B23K 1/00* (2006.01)
*B23K 3/04* (2006.01)
(Continued)

(52) U.S. Cl.
CPC .............. *B23K 1/0004* (2013.01); *B23K 1/00* (2013.01); *B23K 3/04* (2013.01); *B23K 11/00* (2013.01);
(Continued)

(58) Field of Classification Search
CPC ...... B23K 1/0004; B23K 3/04; B23K 11/002; B23K 11/004; B23K 1/00; B23K 11/00;
(Continued)

(56) References Cited

U.S. PATENT DOCUMENTS

| | | | |
|---|---|---|---|
| 2010/0151268 A1* | 6/2010 | Schantz | B32B 15/01 228/178 |
| 2015/0079349 A1* | 3/2015 | Russell | B23K 1/0008 428/167 |
| 2015/0290771 A1* | 10/2015 | Li | B24D 3/06 51/297 |

FOREIGN PATENT DOCUMENTS

| | | | |
|---|---|---|---|
| GB | 2509790 A | 7/2014 | |
| WO | WO-2016028662 A1 * | 2/2016 | .............. B22F 3/105 |

OTHER PUBLICATIONS

Philadelphia Carbide Company. "The Extraordinary Properties of Tungsten Carbide". https://www.philacarbide.com/Properties.php (Year: 2019).*

(Continued)

*Primary Examiner* — Sally A Merkling
*Assistant Examiner* — Marites A Guino-O Uzzle
(74) *Attorney, Agent, or Firm* — Merchant & Gould P.C.

(57) ABSTRACT

The present invention relates to inserts for hard facing substrates, and a method for hard facing substrates. An insert according to an embodiment of the present invention may comprise a body of ultra-hard material having a welding node located on a first surface thereof and at least one wire electrically connecting the first surface to a second, opposite, surface. In use, the inserts may be temporarily connected to a substrate by applying a resistance welding electrode to the welding node, thereby causing the wires on the second surface to melt and weld the insert to the substrate. A subsequent brazing step may firmly attach the inserts to the substrate.

14 Claims, 13 Drawing Sheets

(51) Int. Cl.
  *B23K 11/00*   (2006.01)
  *B24D 3/06*    (2006.01)
  *B32B 9/04*    (2006.01)
  *B23K 101/00*  (2006.01)
  *B23K 101/20*  (2006.01)
  *E21B 10/00*   (2006.01)
  *E21B 17/10*   (2006.01)

(52) U.S. Cl.
  CPC .......... *B23K 11/002* (2013.01); *B23K 11/004* (2013.01); *B24D 3/06* (2013.01); *B32B 9/041* (2013.01); *B23K 2101/002* (2018.08); *B23K 2101/20* (2018.08); *E21B 10/00* (2013.01); *E21B 17/1085* (2013.01)

(58) Field of Classification Search
  CPC .......... B23K 2101/002; B23K 2101/20; B23K 2101/00; B24D 3/06; B32B 9/041; B32B 9/04; E21B 17/1085; E21B 10/00; E21B 17/10; E21B 10/003
  See application file for complete search history.

(56) References Cited

OTHER PUBLICATIONS

Capital Steel & Wire Inc. "Steel Faqs" https://capitalsteel.net/blog/steel-faqs#:~:text=Yes%2C%20steel%20is%20a%20conductor,available%20at%20relatively%20inexpensive%20prices. (Year: 2024).*
Combined Search and Examination Report under Sections 17 and 18(3) for GB Application No. 1911769.6 dated Dec. 10, 2019 (6 pages).

* cited by examiner

APPARATUS AND METHOD FOR HARD FACING A SUBSTRATE

RELATED APPLICATIONS

This application claims the benefit of priority to GB Application No. 1911769.6, filed Aug. 16, 2019, the entire disclosure of which is incorporated herein by reference.

TECHNICAL FIELD

The present invention relates to the general field of providing hard coatings, or hard facing, of tool surfaces. Aspects of the invention relate to an insert for hard facing a tool, to a tool and to a method of hard facing a tool.

BACKGROUND

To improve the wear resistance of tools for use in abrasive environments, a material with a high hardness may be applied to the surface of the tool. This process is known as hard facing. Example of a hard facing materials include tungsten carbide and polycrystalline diamond. The hard facing material is often in the form of small regular shaped blocks, which may be referred to as hard facing tips or inserts. Hard facing inserts may be permanently attached to the material that is to be hard faced (referred to as the substrate). Hard facing inserts are often approximately cuboid in shape, often with rounded edges or ends. However the size and shape of hard facing inserts is variable.

A process for the hard facing of a substrate may comprise placing the insert in contact with the substrate with the hard facing face of the insert orientated outwards from the substrate. The inserts may then be temporarily retained in place, for example by welding, soldering or with an adhesive. The inserts may then be brazed to the substrate by flame spraying with a molten alloy (or "braze material"). Any surplus alloy can then be ground down by an abrasive surface to give a hard faced surface of uniform height.

With some hard facing inserts, and in particular thermally stable polycrystalline diamond inserts, adhesion of the insert to the braze material can be limited, due to low "wetting" of the molten material against the surfaces of the insert.

It is an object of embodiments of the invention to at least mitigate one or more of the problems of the prior art.

SUMMARY OF THE INVENTION

Aspects and embodiments of the present invention are defined in any one of the accompanying claims.

According to an aspect of the invention for which protection is sought, there is provided an insert for hard facing a wear surface of a substrate, said insert comprising:
  i) an ultra-hard body in a geometric shape comprising a first substantially planar surface and a second substantially planar surface opposite said first substantially planar surface;
  ii) a welding node located on the second substantially planar surface;
  iii) at least a first wire having a first portion and a second portion, wherein the first and second portions are each located proximal said welding node and wherein the first wire is at least partially wrapped around the body, such that the wire at least partially traverses the first substantially planar surface; and
  iv) a boundary coating on the ultra-hard body for rendering the body wettable by a braze material. Advantageously, the welding node provides a convenient target for a resistance welding electrode, and the first wire provides an electrical connection between the first and second surfaces. In use, it is expected that the portion of the first wire that traverses the first substantially planar surface will abut the substrate to be hard faced, and that when the spot welding electrode is brought into contact with the welding node the portion of the first wire that abuts the planar surface will fuse the insert to the substrate, causing the insert to be welded to the substrate. Although this weld is not expected to be strong enough to retain the insert on the substrate in use, it is sufficient to retain the insert in place during a subsequent brazing step. Furthermore, the weld produced by the melted wire causes a predetermined gap to be present between the substrate and the ultra-hard body, which gap may be filled by capillary action in the subsequent brazing step.

A further advantage of the first wire is that it acts to retain the welding node in place.

Optionally, the ultra-hard body is a thermally stable polycrystalline diamond (TSP) body. TSP is known to have extremely high hardness, and therefore has potential to be an excellent hard facing material. However, it has hitherto been difficult or expensive to attach TSP to a high proportion of a surface to be hard faced. In another embodiment, the ultra-hard body may be a polycrystalline cubic boron nitride (PCBN) body.

Optionally, the welding node is an electrically conductive disc. Further optionally, disc is formed from nickel.

Alternatively, the welding node is a coil of wire, optionally wherein the coil of wire is continuous with the first wire.

In an embodiment, the at least one wire is formed of nickel. Nickel provides an appropriate conductivity and an appropriate melting point to be used in resistance welding inserts to a substrate according to the methods described herein.

In an embodiment, the boundary coating comprises tungsten. Advantageously, the tungsten coating may chemically react with the carbon in the TSP body, thereby forming a chemically-bonded layer of tungsten carbide on an outer surface of the TSP body. This layer has significantly improved wettability with molten metal braze materials than the uncoated TSP.

In an embodiment, the insert, further comprises a second wire, wherein the second wire has first and second portions, each of the first and second portions being located proximate the welding node, and wherein the second wire is wrapped around the body, such that the wire at least partially traverses the first substantially planar surface. Advantageously, use of two wires provides an improved spot weld, because there are two welding locations for each insert. Furthermore, the retention of the welding node and the provision of a pre-defined gap are both improved by providing two wires.

Optionally, the wire and the welding node are brazed to the ultra-hard body using a first braze material. Advantageously, the first braze material firmly retains the wires and the welding node during spot welding and before the inserts are used. Further optionally, the first braze material comprises copper. The first braze material may be an alloy containing copper.

In an embodiment, the boundary coating is less than 0.05 millimetres thick.

The first and second portions of the first wire (and optionally also the first and second portions of the second wire) may, or may not, be opposing ends of the wire.

According to another aspect of the invention for which protection is sought, there is provided mounting system comprising a welding node for positioning on a body, and a first wire for at least partially wrapping around a body, such that it at least partially traverses a welding portion of said body, said first wire having a first portion and a second portion, wherein the first and second portions are each located proximal said welding node.

Optionally, the welding node is an electrically conductive disc. Further optionally, the disc is formed from nickel.

In an embodiment, the welding node is a coil of wire, optionally wherein the coil of wire is continuous with the first wire.

According to another aspect of the invention for which protection is sought, there is provided a tool comprising a tool surface, wherein a plurality of inserts as described above are located on the tool surface, the inserts being secured in place by a braze material filling the gaps between the inserts.

According to another aspect of the invention for which protection is sought, there is provided a method of hard facing a substrate comprising:

i) placing one or more inserts as described above onto the substrate;

ii) resistance welding the or each TSP insert to the substrate by applying electrical current to the welding node until the at least one wire fuses with the substrate; and iii) brazing the or each insert into position. Advantageously, this provides a convenient method of firmly attaching ultra-hard bodies to a surface to be hard faced. Because the wires occupy relatively little space, the method allows a high proportion of the surface to be covered by the ultra-hard bodies, with relatively small gaps between the bodies.

A plurality of inserts may be placed onto the substrate.

In an embodiment the method further comprises the step of compressing the portion of the first wire that traverses the first substantially planar surface, such that the combined thickness of the ultra-hard body and the portion of the first wire that traverses the first substantially planar surface is equal to a predetermined thickness. Advantageously, this ensures that the distance between the surface of the substrate and the upper surface of each of the ultra-hard bodies is approximately constant and equal to the predetermined thickness, even if there is variation in the thickness of the ultra-hard bodies. This ensures that in a subsequent grinding step it is possible to expose the upper surfaces of each of the ultra-hard bodies without the need to grid away a substantial portion of any of the ultra-hard bodies. It will be understood that such grinding would substantially reduce tool life, as the high hardness of the ultra-hard bodies would cause significant wear to the grinding tool.

According to another aspect of the invention for which protection is sought there is provided a kit comprising a plurality of inserts as described above, wherein the combined thickness of each ultra-hard body and the portion of the first wire that traverses the first substantially planar surface of the ultra-hard body is equal to a predetermined thickness. It will be understood that, in the event that a second wire is also present, the thickness of the second wire may be substantially equal to the thickness of the first wire, such that the combined thickness of the ultra-hard body and the portion of the second wire that traverses the first substantially planar surface of the ultra-hard body is also equal to the predetermined thickness. Optionally, the combined thickness of the ultra-hard bodies and the portions of the first (and optionally second) wires that traverse the first surfaces of the ultra-hard bodies are standardised by compressing the portions of the first (and optionally second) wires. As discussed above, standardising the thicknesses of the inserts even in the presence of variations in the thicknesses of the ultra-hard bodies may avoid excessive tool wear during a subsequent grinding step.

BRIEF DESCRIPTION OF THE DRAWINGS

Embodiments of the invention will now be described by way of example only, with reference to the accompanying figures, in which.

DETAILED DESCRIPTION

It is to be understood that the insert, component and methods of the invention are not limited to the details of construction or process steps set forth in the following description. It will be apparent to those skilled in the art having the benefit of the present disclosure that the invention is capable of other embodiments and of being practiced or being carried out in various ways.

Figure 1:
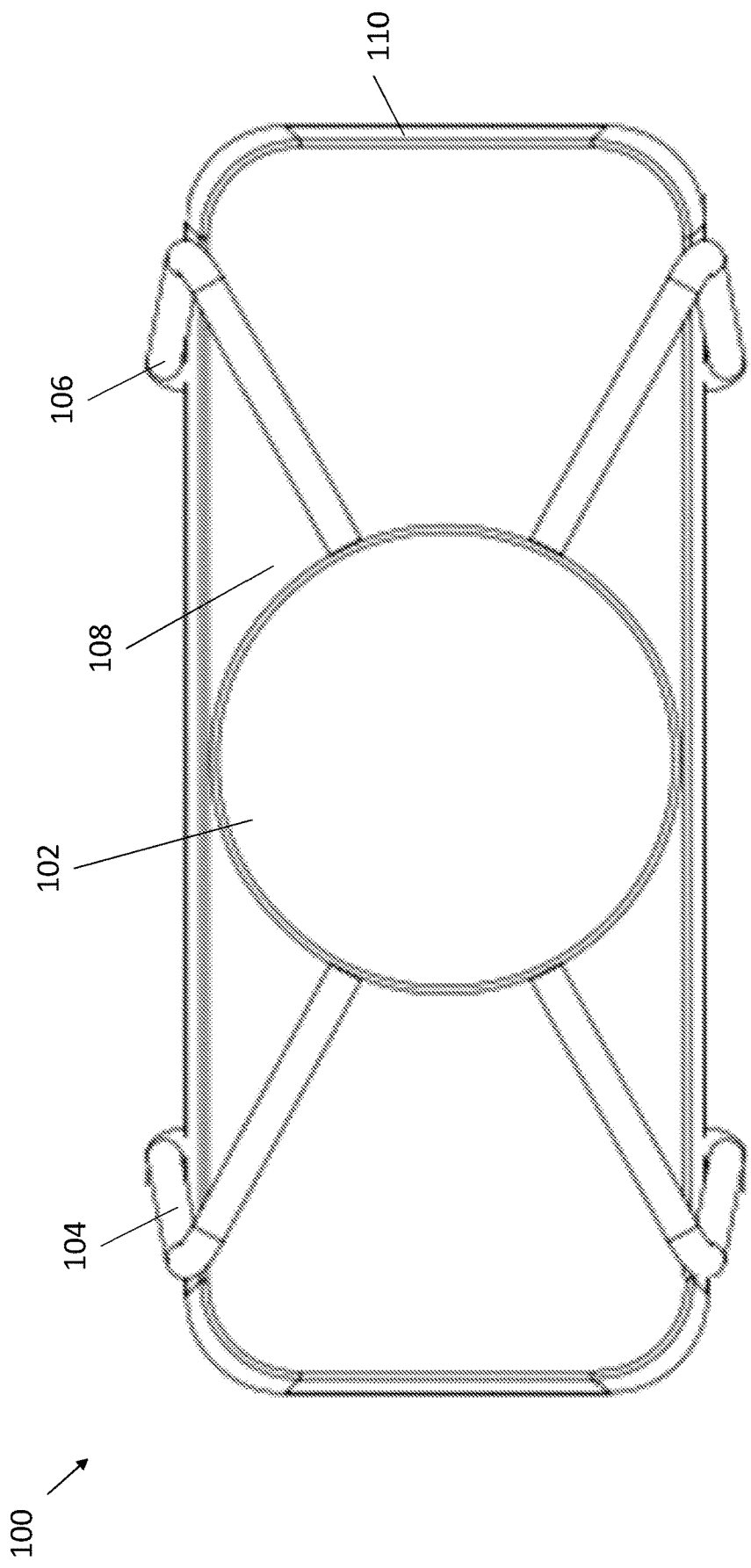
FIG. 1 shows a top view of an insert according to an embodiment of the present invention.

FIG. 1 shows a top view of an insert 100 according to the present invention. The insert shown in this embodiment comprises a body 108 comprising an ultra-hard material, which is thermally-stable polycrystalline diamond (TSP) in the illustrated embodiment, coated in a first brazing material 110. In other embodiments, the ultra-hard material may be polycrystalline cubic boron nitride, or any other material having a substantially higher hardness than tungsten carbide. The insert bodies 108 are provided with a boundary coating to aid wetting of the bodies 108 with the braze material. The boundary coating may be of titanium, tungsten, nickel and copper, amongst others. In the illustrated embodiment, a tungsten coating is applied, using a process as described in GB2509790. This coating provides a layer of tungsten carbide that is chemically bonded to the outer surface of the TSP insert body 108, which layer improves the wettability of the insert bodies by braze materials.

The first brazing material coats the insert bodies 108 and connects a welding node 102 and two wires 104, 106 to the insert body 108. The welding node 102 is in the form of a disc of electrically conductive material such as nickel. Before the coating of the first braze material is applied, the wires may be crimped into place such that they hold the node in place. This ensures that the node 102 is not displaced during an initial braze which affixes the wires 104, 106 and the welding node 102 to the body 108.

The coating with the first braze material is performed by first assembling the wires 104, 106 around the ultra-hard body 108 and positioning the welding node 102 on the upper surface of the body, as shown in FIG. 1. The body and assembled wires and node are then coated in a powder of the first brazing material, which is copper or an alloy containing copper in the illustrated embodiment. The wires and node are then brazed to the ultra-hard body by passing the body and assembled wires and node through a furnace. In the furnace, the powdered braze material melts and covers the surface of the body 108, the wires 104, 106, and the welding node 102, thereby brazing the parts into place. Advantageously, the wires will hold the node in place if it begins to float on the molten first braze material during this step. Accordingly, deviation of the position of the welding node 102 is kept to a minimum.

In use, the insert will be placed onto a substrate to be hard faced. The insert would be orientated to have the welding node 102 face up away from the substrate. Typically, substrate will have a surface area that is significantly larger than that of the inserts, so a plurality of the inserts may be placed across the substrate. The cuboidal shape of the insert allows the inserts to be applied to a substrate in a tessellating arrangement, such that a large percentage of the surface area of the substrate can be covered, with minimal gaps between adjacent inserts. For example, the inserts may be applied to the substrate in a plurality of offset rows, with each row offset from the adjacent rows by approximately one half of the length of an insert, thereby producing a "brickwork" pattern.

Figure 2:
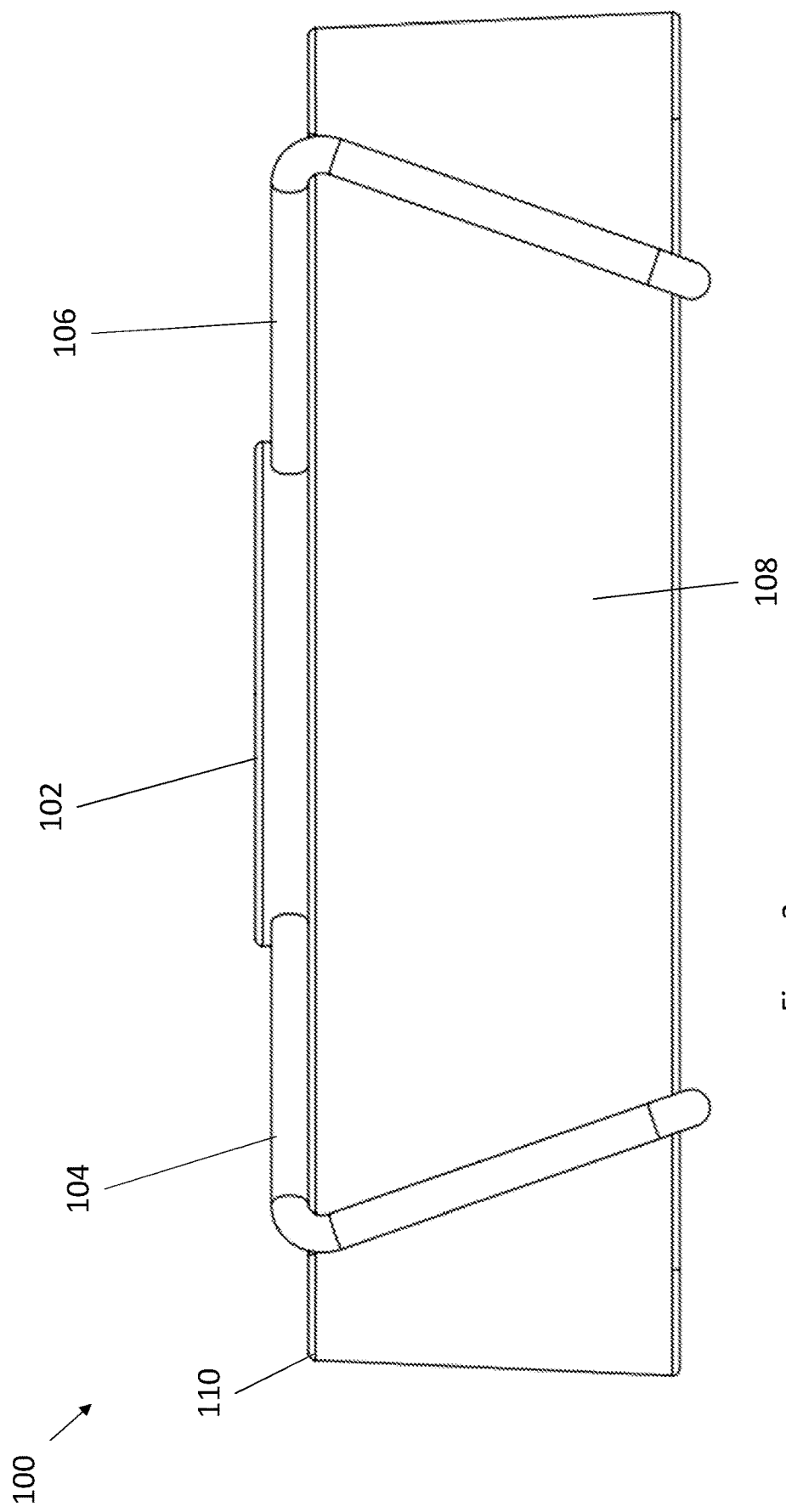
FIG. 2 shows a side view of the insert shown in FIG. 1.

FIG. 2 shows a side view of the insert 100 shown in FIG. 1. The two wires 104, 106 are bent around the sides of the insert, the wires are substantially identical on the opposite face of the body. The wires may be bent such that they have a slight Hookean bias towards clamping onto the body 108, which may help to retain the wires in place during the first brazing step. As discussed above, the wires can be used prior to and during a first brazing to hold the welding node in place, which may otherwise fall off during transportation or float and become misplaced and misaligned when the first brazing material 110 is molten.

In the embodiment shown the wires are located over the top of the body rather than in a groove. In some embodiments the wires may be located in a groove. Locating the wires within a groove may aid with locating the appropriate location for the wires and therefore increase conformity between the inserts being made. However, this may also increase the complexity of manufacturing the ultra-hard bodies 108.

Figure 3:
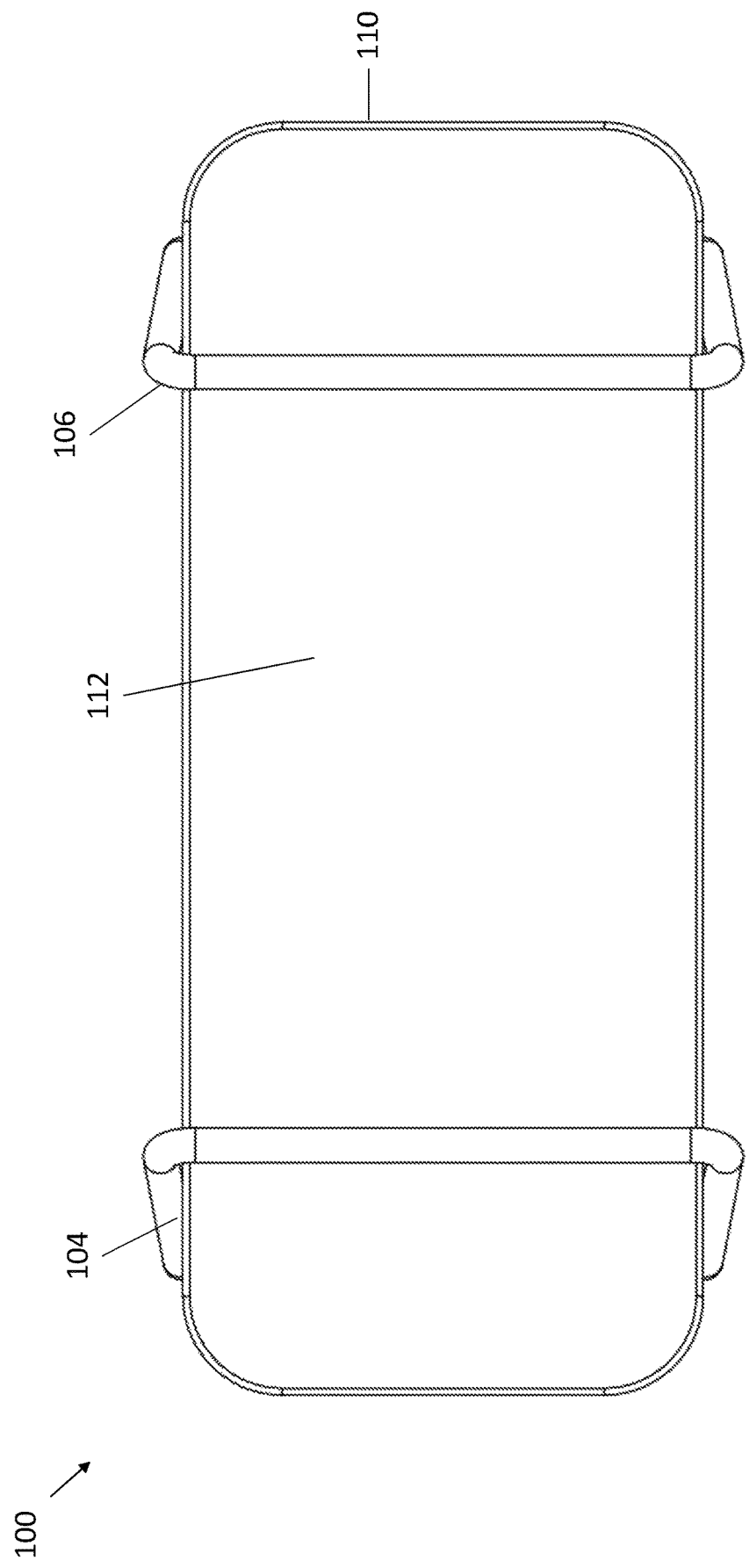
FIG. 3 shows a bottom view of the insert shown in FIG. 1.

FIG. 3 shows a bottom view of the insert 100 shown in FIGS. 1 and 2. It can be seen from FIG. 3 that the two wires 104, 106 are mounted such that the length of the wire traverses the width of the bottom face of the insert. When the insert is placed on a substrate to be hard faced the only component in contact will be the length of the two wires touching the bottom face of the insert, and the area of contact between the wires and the substrate will therefore be small. When current is applied to the welding node 102 it will pass through the wires 104, 106 and into the substrate via the small contact area between the wires and the substrate. This causes the wires 104, 106 to be heated and to fuse to the substrate in the region of contact between the substrate and the wires. A portion of the substrate contacting the wires may also be melted by the high current passing through that region and by conduction heating from the wires. The melted wire and melted portion of the substrate will then intermix, forming a weld between the insert and the substrate upon cooling and solidification. Although this weld is not sufficient to hold the inserts in place when they are in use, it is sufficient to hold them in place during a subsequent brazing step, as will be described in more detail below.

Figure 4:
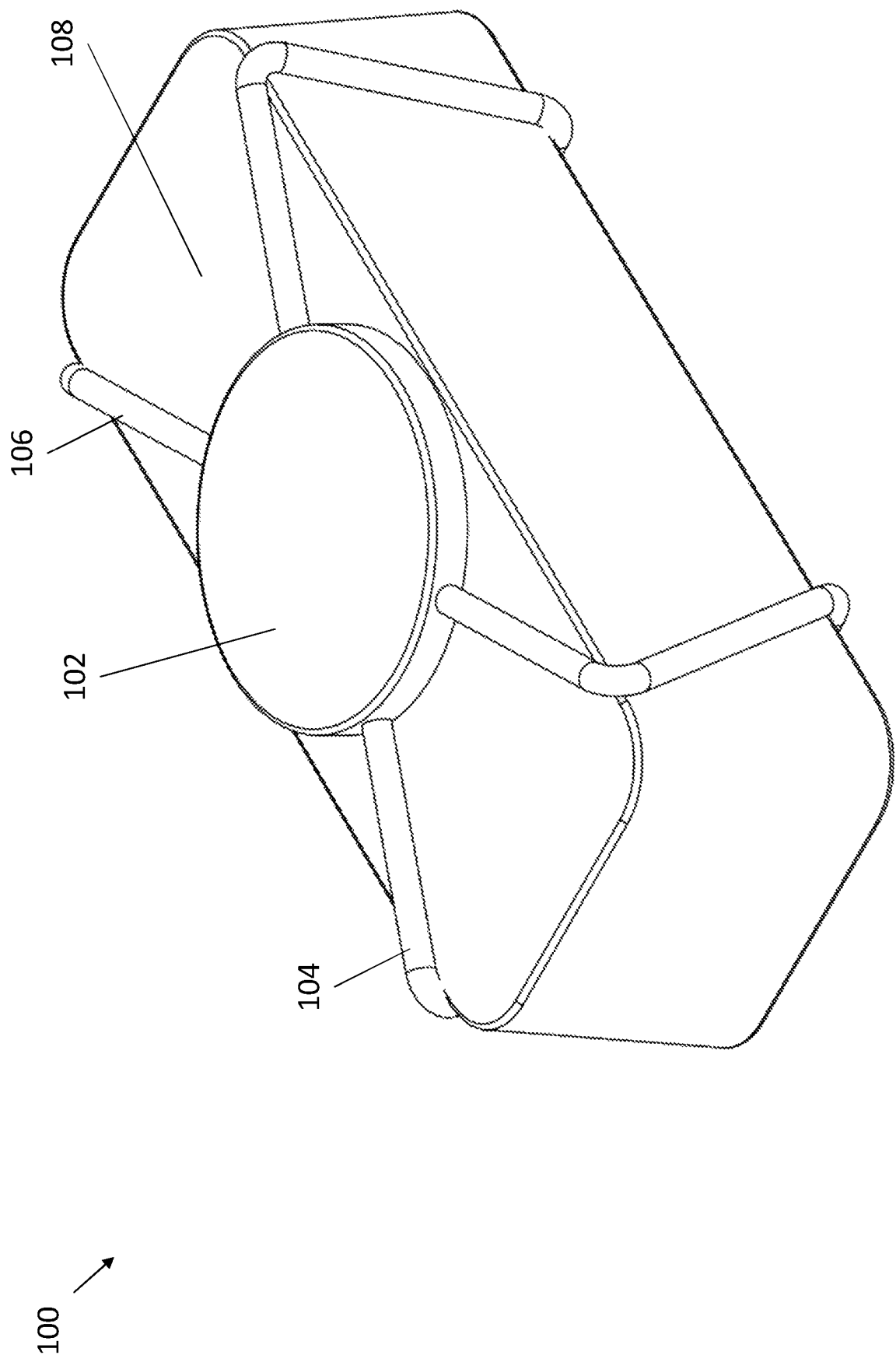
FIG. 4 shows an isometric view of the insert shown in FIG. 1.

FIG. 4 shows an isometric view of the insert 100. The wires 104, 106 are shown connected to the welding node 102. The welding node 102 provides a relatively large area onto which a resistance welding electrode can touch in order to provide a high current which will melt the wires and a local portion of the substrate. Human or robotic operatives will be able to visually locate the welding node and accurately attach the electrode in the correct location to provide consistent welds from insert to insert across the surface of a substrate.

Figure 5:
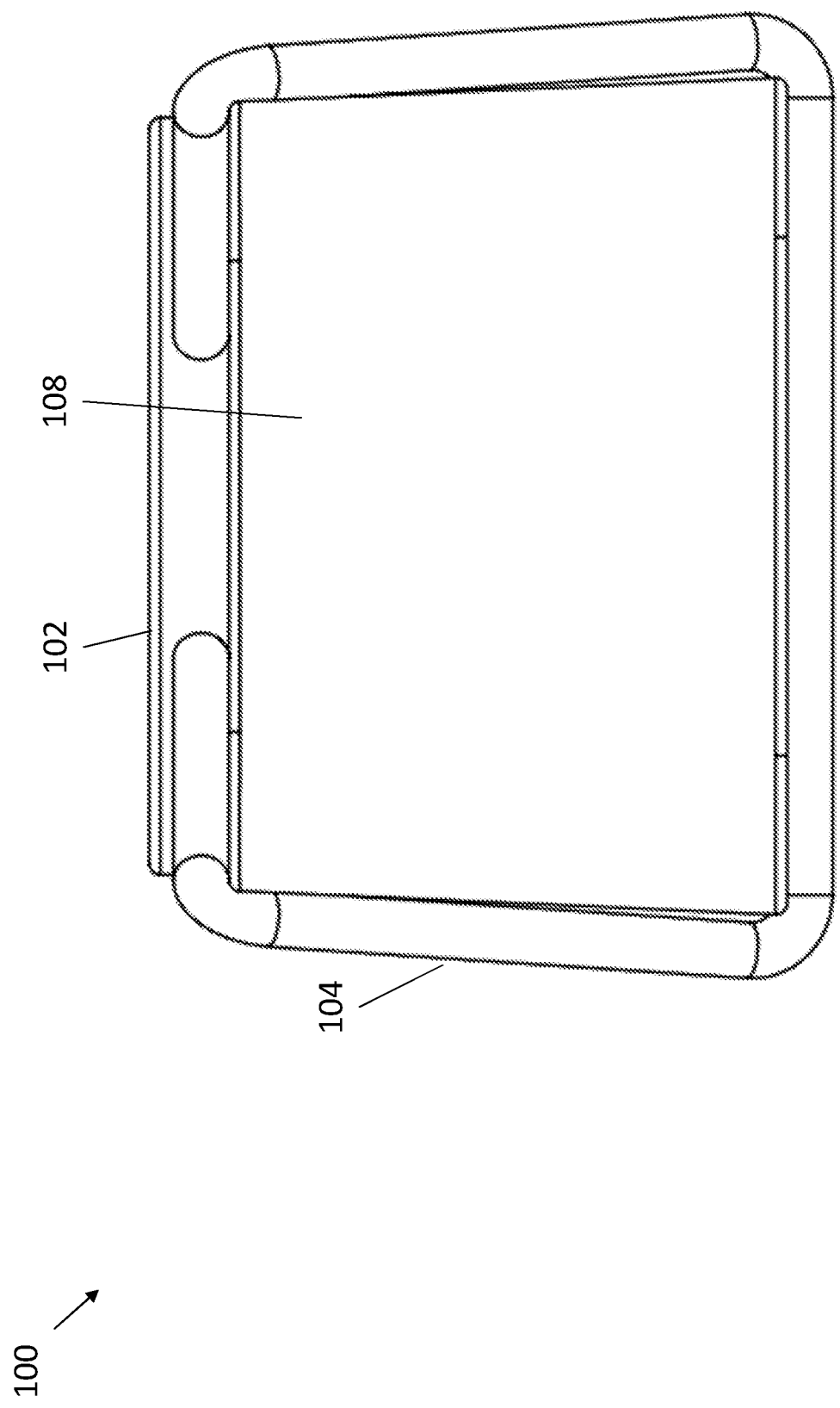
FIG. 5 shows a further side view of the insert shown in FIG. 1.

FIG. 5 shows a side view of the insert 100 according to the present invention. The insert body is slightly tapered such that it is wider on the bottom face than on the top face. This allows for a greater area of the substrate to be covered by the insert. In the embodiment shown the wire 104 is attached along the "long" sides of the insert. It will be understood that the other wire 106 is located on the insert in a similar manner from the opposite end of the insert body 108.

Figure 6:
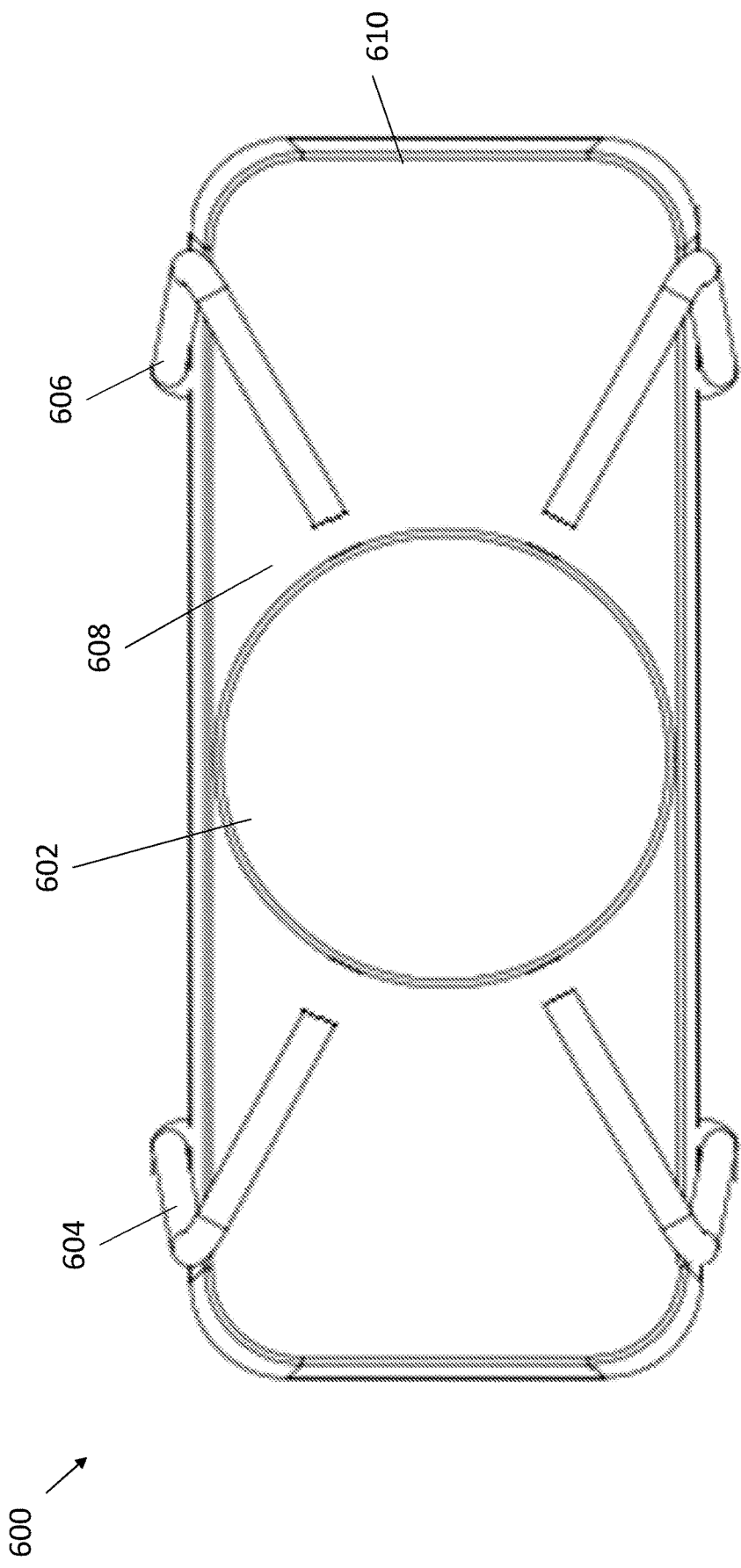
FIG. 6 shows a top view of an insert according to another embodiment of the present invention.

FIG. 6 shows a top view of an insert 600 according to a further embodiment of the present invention. The insert 600 is similar to those previously described with respect to FIGS. 1-5, and comprises a body 608 coated in a brazing material 610, which brazing material holds a welding node 602 and two wires 604 and 606 in position. However, in the embodiment shown in FIG. 6 there is a small gap between the welding node 602 and the ends of the wires 604, 606. However, despite the small gap between the welding node 602 and the wires 604, 606, the wires still behave in substantially the same way as in the previously described embodiments. This is because the braze material 610 provides a conductive path between the welding node 602 and the ends of the wires 604, 606. Indeed, the braze material 610 may form a meniscus in the regions where the wires 604, 606 and the welding node 602 meet the insert body, thereby increasing the thickness of the braze material in the gap between the ends of the wires 604, 606 and the welding node 602. Accordingly, when the welding electrode is attached current will flow through the node into the body and then into the wires which will then still melt despite the small gap between the wire and the node.

However, although it is possible to rely solely on the braze material to provide a conductive path between the top surface of the inserts (to which a welding probe is to be applied) and the bottom surface of the inserts (which is intended to melt and weld the insert to the substrate), the present inventors have recognised that providing a wire along a substantial part of the path between the insert and the bottom surface significantly reduces the incidence of inserts failing to attach to the substrate sufficiently strongly to remain in place during the second brazing step.

Figure 7:
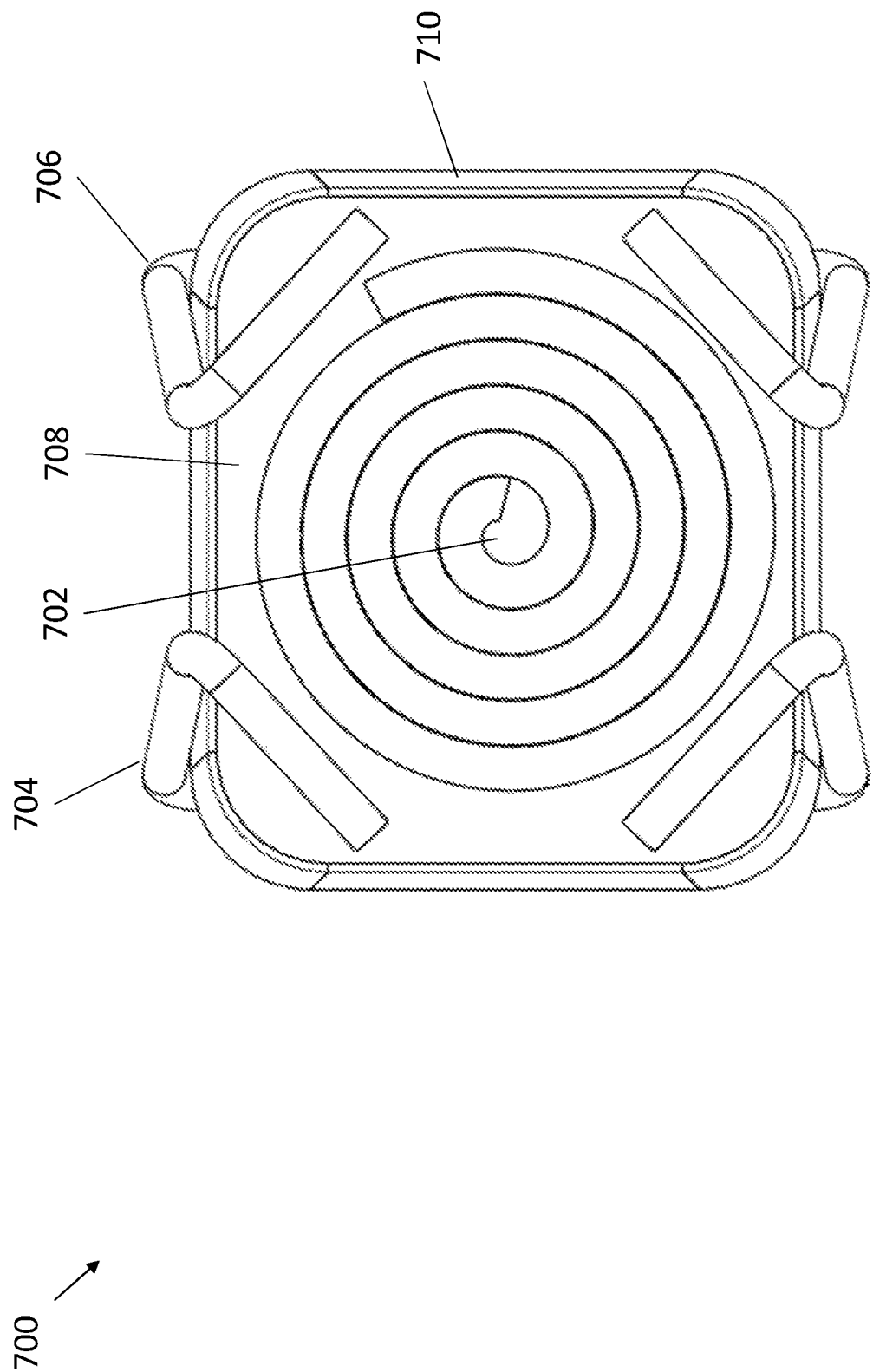
FIG. 7 shows a top view of an insert according to a further embodiment of the present invention.
Figure 8:
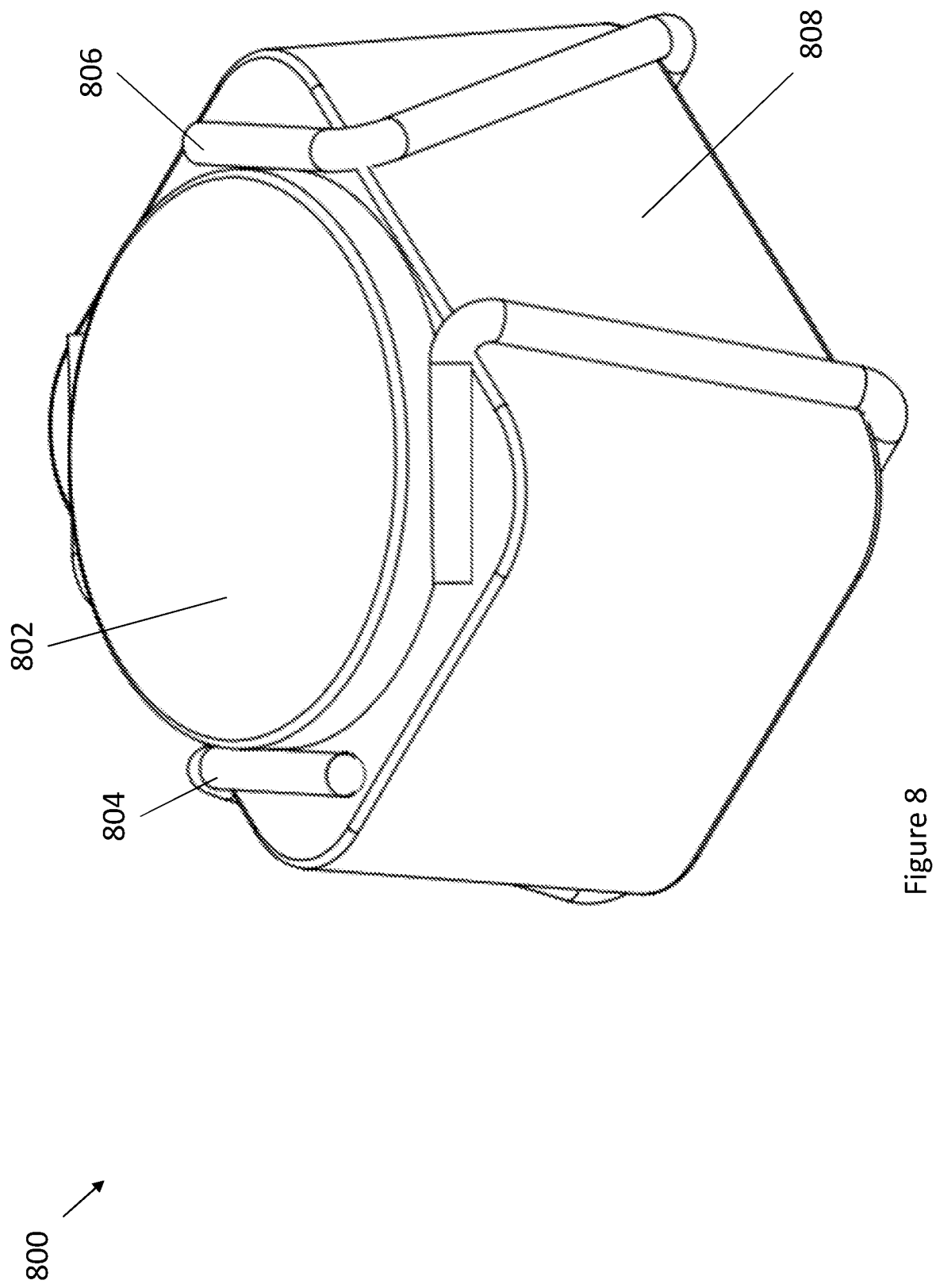
FIG. 8 shows an isometric view of an insert according to a further embodiment of the present invention.
Figure 9:
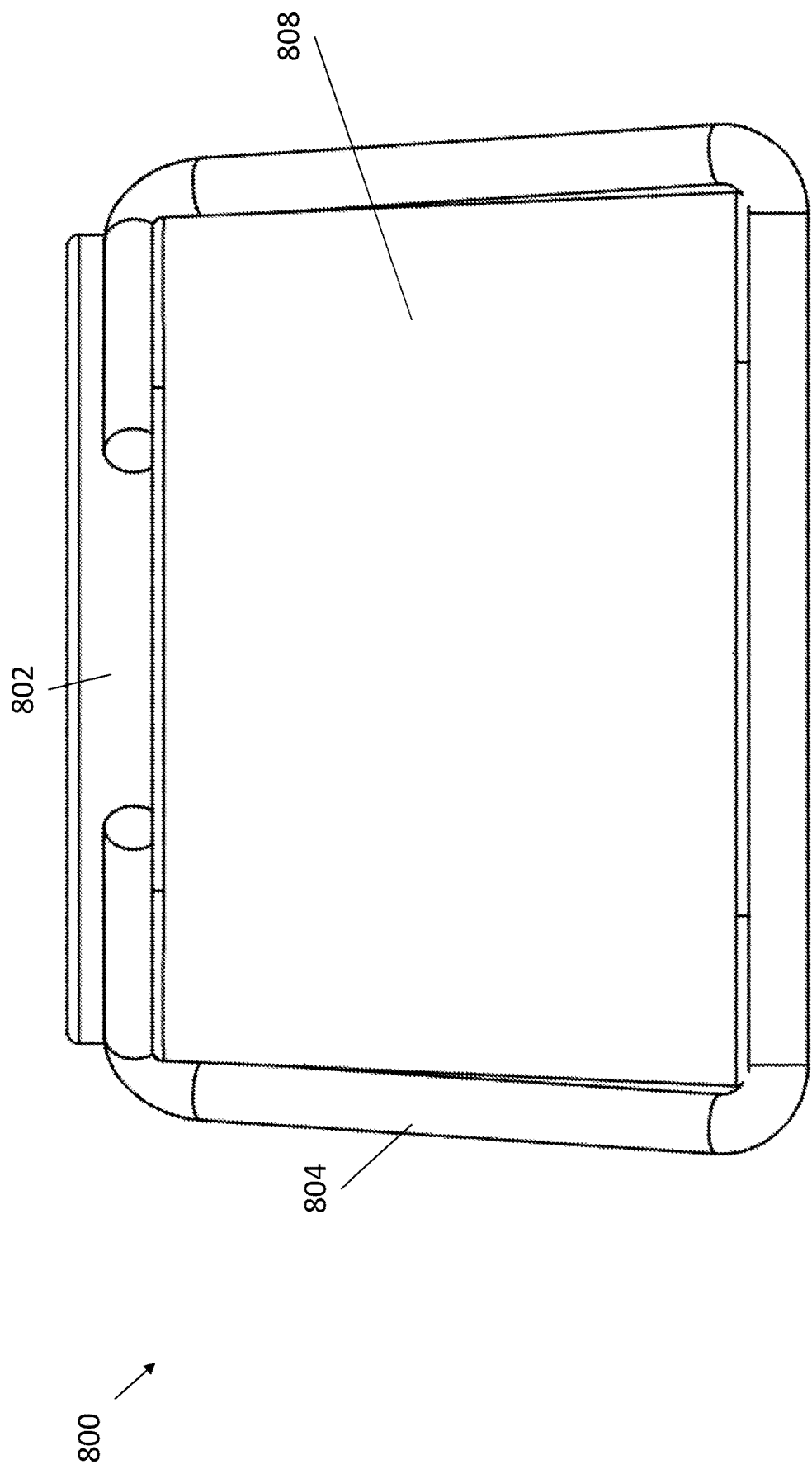
FIG. 9 shows an side view of the insert according shown in FIG. 8.
Figure 10:
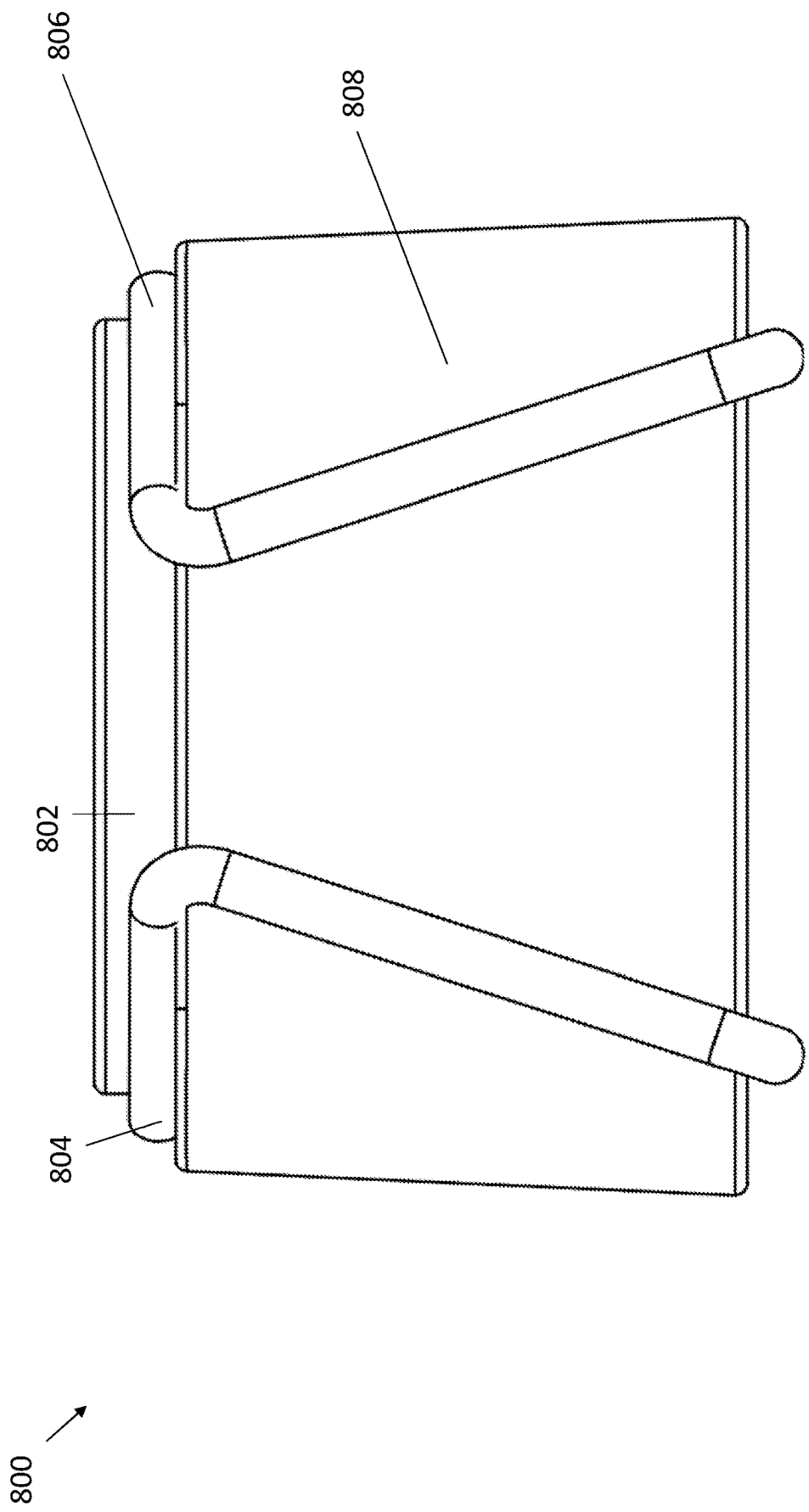
FIG. 10 shows another side view of the insert shown in FIG. 8.

FIG. 7 shows a top view of a further embodiment of the present invention. The insert 700 is similar to those previously described with respect to FIGS. 1-5, and comprises a body 708 coated in a brazing material 710. The brazing material holds a welding node 702 and two wires 704 and 706 in position. However, in the embodiment shown in FIG. 7 the welding node comprises a wire coil, and. Using a wire in place of a disc may reduce the amount of material required to form the welding node, and it may ensure that the welding node cannot accidentally become removed from the body 708 during the first brazing step. Although there is a gap shown in this figure the wires and welding node may be formed of a single continuous wire.

Figure 11:
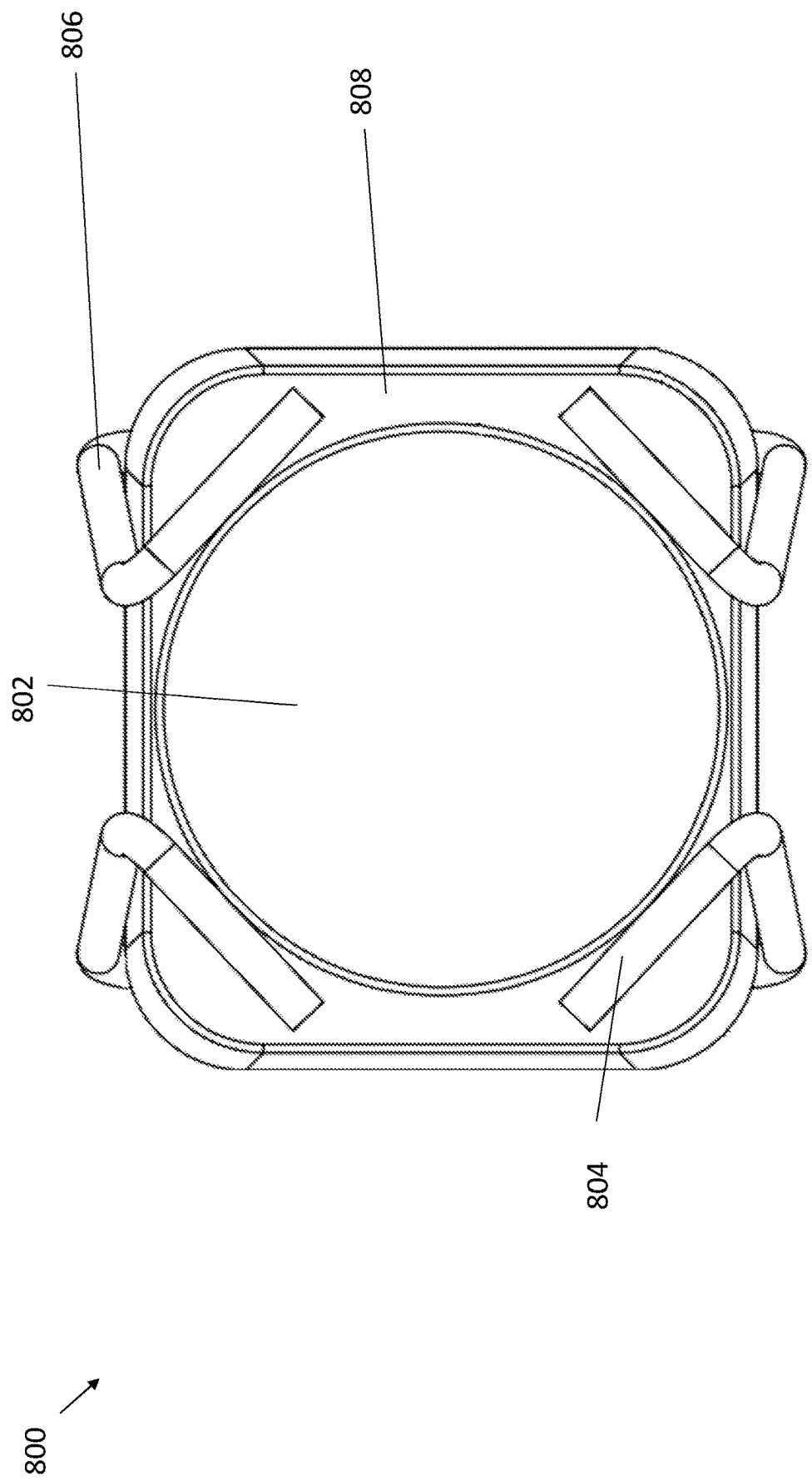
FIG. 11 shows an top view of the insert shown in FIG. 8.

FIGS. 8-11 show different views of an insert 800 according to another embodiment of the present invention. Similar to the inserts shown in FIGS. 1-5, the insert comprises a body of ultra-hard material 808 (which material is TSP in the illustrated embodiment), a welding node 802 and two wires 804, 806 extending partially around the body 808 so as to provide an electrical connection between the welding node 802 on the top surface of the body and the portions of the wires that extend along the bottom surface of the body. As best seen in FIG. 11, the top and bottom surfaces of the body 808 of the insert each have a square shape, as opposed to the rectangular shape of the corresponding surfaces of the inserts shown in FIGS. 1-5. However the wires 804, 806, welding node 802 and other dimensions of the body are substantially the same as those shown in FIGS. 1-5. Accordingly, inserts having square top and bottom surfaces as shown in FIGS. 8-11 may be produced using ultra-hard bodies having a different shape to those used in the embodiments shown in FIGS. 1-5, without the need to produce different welding nodes or wires. Advantageously, the inserts 800 may be used to cover areas that are too small to be covered by inserts having a rectangular cross section as shown in FIGS. 1-7.

It should be noted that, in the embodiment shown in FIGS. 8-11, the ends of the wires 804, 806 are directed outwardly, rather than inwardly as is the case in the embodiment shown in FIGS. 1-5. Accordingly, a portion of the wires that is remote from the ends is contact with or proximate to with the welding node. Reversing the direction in which the wires 804, 806 are pushed onto the bodies of TSP in this manner allows for the same components (other than the body) and method of manufacture to be used when producing inserts having square and rectangular cross sections.

Figure 12:
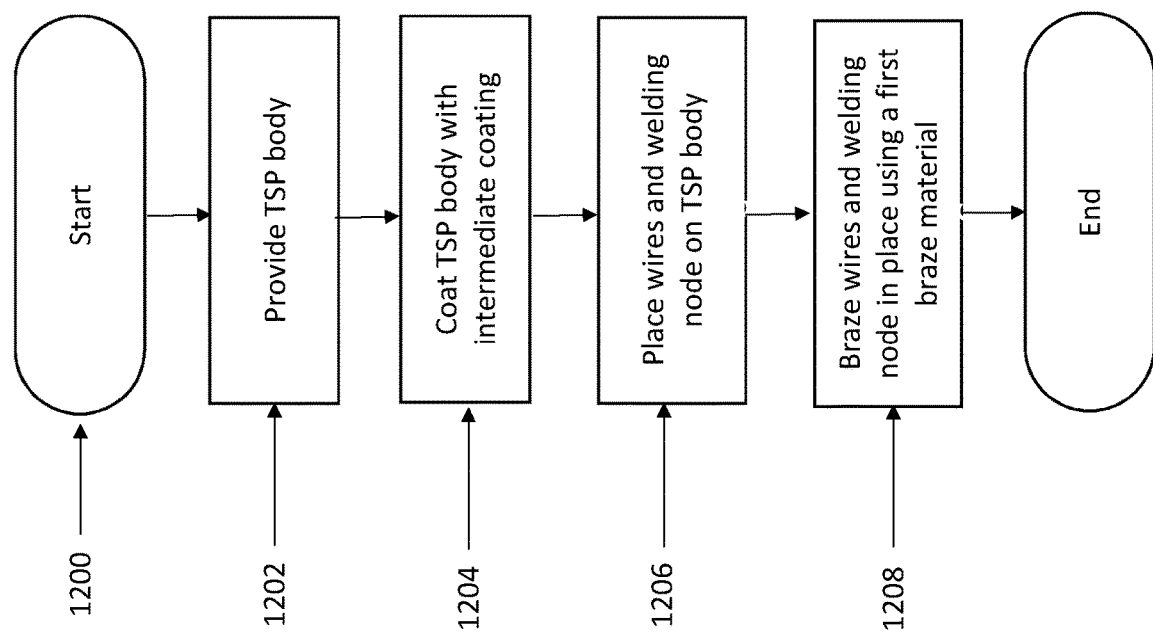
FIG. 12 shows a flow chart illustrating a method of producing inserts according to an embodiment of the present invention.

A method 1200 of manufacturing an insert according to an embodiment of the present invention will now be described with reference to FIG. 12.

The method starts at step 1202, in which a TSP body of the desired shape is provided, the body may have a rectangular cross section, as shown in FIGS. 1-7, a square cross section as shown in FIGS. 8-11, or any other appropriate cross section. Although the ultra-hard body is a TSP body in the present embodiment, it will be understood that other ultra-hard materials may be used in alternative embodiments.

The method then proceeds to step 1204, in which the TSP body is coated with an boundary coating so as to improve the wettability of the TSP body by braze materials, which typically comprise molten metals. The boundary coating is a tungsten coating applied using a process as described in GB2509790. This produced a layer of chemically-bonded tungsten carbide on the outer surface of the TSP body, which improves wettability by braze materials. Once the iboundary coating has been applied, the wires are placed around the insert and the welding node is placed on a top surface of the body. The position of the welding node is at least partially constrained by the wires.

The method then proceeds to step 1208, in which the wires and welding node are brazed into place on the TSP body. This is achieved by coating the TSP body with the wires and welding node in place with a copper braze powder, and then placing the assembly in a furnace to produce an insert comprising wires and a welding nodes brazed to a TSP body.

It will be understood that a batch of inserts will typically be produced simultaneously.

It is important that the dimensions of a batch of inserts is homogeneous, otherwise when inserted onto a component surface, one or more could stick out and cause excessive wear when the surface is ground to its intended height, reducing the lifespan of the grinding component. Due to the variability in the dimensions of the TSP body it may be necessary to normalise the dimensions of the insert. The total height of the wires on the underside and the TSP body combined could be standardised by compressing the inserts such that the wires on the underside of the inserts are plastically deformed. This step could be performed with a hydraulic press for example, wherein the inserts with larger TSP bodies would have their wires deformed more than the inserts that had relatively smaller TSP bodies. This would standardise the heights of the inserts such that when several are placed on a flat surface, they are all level with each other.

Figure 13:
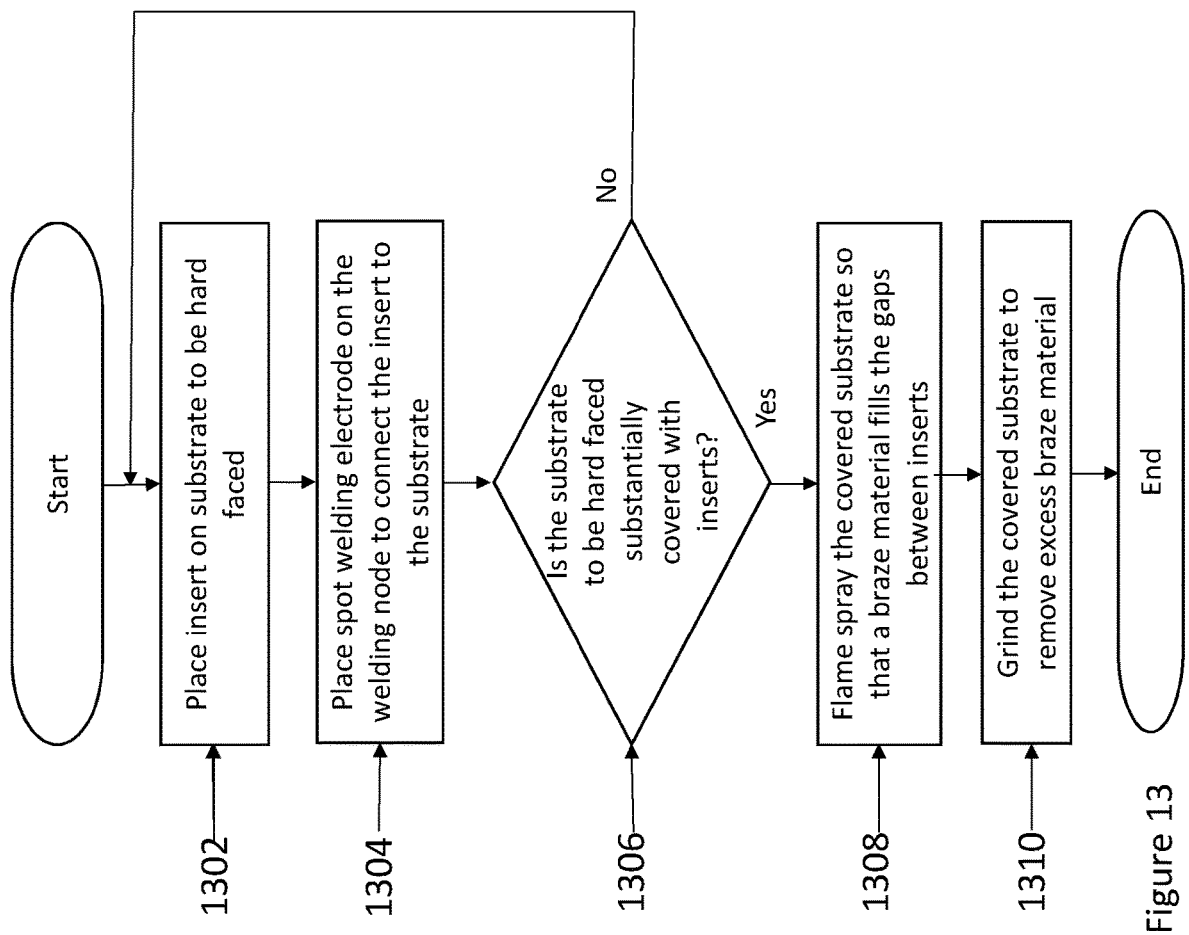
FIG. 13 shows a flow chart illustrating a method of hard facing a substrate according to an embodiment of the present invention.

The process of hard facing a substrate using inserts according to embodiments of the present invention will now be described in more detail, with respect to FIG. 13.

The method stats at step 1302, in which an insert is positioned at a desired location on the substrate to be hard faced. A spot welding electrode is then brought into contact with the welding node in step 1304, such that a large current passes though the node and the wires and into the substrate. This heats the wires to their melting point, and simultaneously also melts a portion of the substrate close to the wires, forming a melt pool comprising the wires and a small volume of substrate. Upon solidification of the melt pool, the insert is welded to the substrate.

The method then proceeds to step 1306, in which the operator checks whether or not the surface is substantially covered with inserts. If the surface is not yet covered, then steps 1302 and 1304 are repeated until it is covered. If the surface is covered, then the method proceeds to step 1308, in which a second braze material is applied to the substrate by flame spraying. The second braze material fills all of the gaps between the inserts, including the gap between the bottom surface of the insert and the outer surface of the substrate. The thickness of the wires may be selected to ensure that the gap between the bottom surface of the insert and the outer surface of the substrate can be filled with the second braze material by capillary action. It will be understood that any or all of the wires, the first braze material and the welding node may melt during the application of the second braze material. In this case, the melted parts may be subsumed into the second braze material during the flame spraying process.

The method then proceeds to step 1308, in which the surface is ground to remove excess braze material and expose the top surfaces of the inserts.

As referred to herein "hard facing" may refer to the process whereby a wear resistant surface comprising a high hardness material is applied to a substrate surface.

As referred to herein "substrate" may refer to a material to which a hard facing surface is applied. In a non-limiting example, the substrate may comprise part of a down-hole tool having aspects that are prone to wear when in use. In a non-limiting example, the substrate surface may comprise a curved surface.

As referred to herein "hard facing insert" may refer to the high hardness material that is applied to a substrate as part of hard facing. The hard facing inserts may comprise discrete elements. In a non-limiting example, hard facing inserts may comprise discrete elements of approximately cuboidal shape, although other shapes are of course possible and within the scope of the present invention. Non-limiting examples include hard facing inserts that comprise tungsten carbide, polycrystalline diamond (including thermally stable polycrystalline diamond) or polycrystalline cubic boron nitride, furthermore, it is expressly intended that when either example is referred to specifically, that it is considered interchangeable with the other.

As referred to herein "hard facing face" may refer to the face of a hard facing insert which presents the hard facing surface when applied to a substrate. In particular, the hard facing face may be considered to be the face of an insert opposite to the part of the insert that faces the substrate.

As referred to herein "crimping" may refer to a process whereby a material is plastically deformed into a desired position or shape by compressive force against a forming piece. In particular, this may refer to a process whereby a tool is used to deform the material into a desired positon. In particular, this may refer to a process whereby the forming piece is an insert against which a mount is formed.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An insert for hard facing a wear surface of a substrate, said insert comprising:
   i) an ultra-hard body in a geometric shape comprising a first substantially planar surface and a second substantially planar surface opposite said first substantially planar surface;
   ii) a welding node located on the second substantially planar surface;
   iii at least a first wire having a first portion and a second portion, wherein the first and second portions are each located proximal said welding node and wherein the first wire is at least partially wrapped around the body, such that the wire at least partially traverses the first substantially planar surface; and
   iv) a boundary coating on the ultra-hard body for rendering the body wettable by a braze material.

2. The insert of claim 1, wherein the ultra-hard body is a thermally stable polycrystalline diamond body.

3. The insert of claim 1, wherein the welding node is an electrically conductive disc.

4. The insert of claim 3, wherein the disc is formed from nickel.

5. The insert of claim 1, wherein the welding node is a coil of wire.

6. The insert of claim 5, wherein the coil of wire is continuous with the first wire.

7. The insert of claim 1, wherein the at least one wire is formed of nickel.

8. The insert of claim 1, wherein the boundary coating comprises tungsten.

9. The insert of claim 1, further comprising a second wire, wherein the second wire has first and second portions, each of the first and second portions being located proximate the welding node, and wherein the second wire is at least partially wrapped around the body, such that the wire at least partially traverses the first substantially planar surface.

10. The insert of claim 1, wherein the wire and the welding node are brazed to the ultra-hard body using a first braze material.

11. The insert of claim 10, wherein the first braze material comprises copper.

12. The insert of claim 1, wherein the boundary coating is less than 0.05 millimetres thick.

13. A method of hard facing a substrate comprising:
   i) placing one or more inserts as claimed in claim 1 onto the substrate;
   ii resistance welding the one or more inserts to the substrate by applying electrical current to the welding node until the at least one wire fuses to the substrate; and
   iii) brazing the one or more inserts into position.

14. The method of claim 13 further comprising the step of compressing the portion of the first wire that traverses the first substantially planar surface, such that the combined thickness of the ultra-hard body and the portion of the first wire that traverses the first substantially planar surface is equal to a predetermined thickness.

* * * * *